United States Patent

[11] 3,589,105

| [72] | Inventors | Philip S. Becker<br>Erie;<br>Martin C. Krause, Wattsburg, both of, Pa. |
|---|---|---|
| [21] | Appl. No. | 793,256 |
| [22] | Filed | Jan. 23, 1969 |
| [45] | Patented | June 29, 1971 |
| [73] | Assignee | Van-Air Inc. |

[54] DELIQUESCENT DESICCANT GAS DRYER
18 Claims, 16 Drawing Figs.

[52] U.S. Cl. ............................................. 55/221
[51] Int. Cl. ....................................... B01d 53/14
[50] Field of Search............................................ 55/221, 281, 388

[56] References Cited
UNITED STATES PATENTS

| 1,866,207 | 7/1932 | Hansen | 55/281 |
|---|---|---|---|
| 1,950,502 | 3/1934 | Madan | 55/388 |
| 2,071,811 | 2/1937 | Bartuska et al. | 55/388 X |
| 2,175,469 | 10/1939 | Kaufman | 55/388 X |
| 2,279,326 | 4/1942 | Kaufman | 55/221 |
| 2,540,339 | 2/1951 | Kritzer | 165/182 X |
| 2,913,832 | 11/1959 | Kaufman | 55/388 X |
| 3,152,877 | 10/1964 | Kaufman | 55/221 X |
| 3,179,389 | 4/1965 | Nutter | 261/114 |
| 3,246,453 | 4/1966 | Becker | 55/281 |
| 3,303,621 | 2/1967 | Hill | 55/388 X |
| 3,312,041 | 4/1967 | Hill | 55/388 X |

*Primary Examiner*—Tim R. Miles
*Attorney*—Baldwin, Egan, Walling & Fetzer

ABSTRACT: A deliquescent desiccant-type air or gas dryer comprising a housing with a gas inlet and a gas outlet, and with a novel double grid arrangement dividing the housing into an upper chamber, an intermediate chamber and a lower chamber. The upper grid is adapted to support a gas pervious bed of chemical deliquescent desiccant material in particle or pelletlike form thereon and the lower grid spaced downwardly from the upper grid, is adapted to prevent the desiccant solution originating from the desiccant bed and collected in the bottom of the dryer housing, from being splashed up into contact with the underside of the bed of desiccant material, and is also adapted to diffuse the incoming gas prior to its contact with and passage into the desiccant bed, resulting in a dryer that has more uniform flow of gas through the desiccant bed, thus resulting in a more effective and efficient drying operation. Moreover, a novel gas inlet arrangement is provided for directing inlet gas upwardly away from the lower portion of the dryer housing where the desiccant solution collects, to aid in preventing contamination of inlet gas while diffusing the inlet gas and reducing the velocity of the gas stream at its entry into the dryer housing.

INVENTORS
PHILIP S. BECKER
MARTIN C. KRAUSE
Baldwin, Egan, Walling & Fetzer
ATTORNEYS

INVENTORS
PHILIP S. BECKER
MARTIN C. KRAUSE
Baldwin, Egan, Walling & Fetzer
ATTORNEYS

INVENTORS
PHILIP S. BECKER
MARTIN C. KRAUSE
Baldwin, Egan, Walling & Fetzer
ATTORNEYS

INVENTORS
PHILIP S. BECKER
MARTIN C. KRAUSE
Baldwin, Egan, Walling & Fetzer
ATTORNEYS

INVENTORS
PHILIP S. BECKER
MARTIN C. KRAUSE
Baldwin, Egan, Walling & Fetzer
ATTORNEYS

DELIQUESCENT DESICCANT GAS DRYER

This invention relates to general to the art of drying air or gas, and more particularly relates to a drying device for removing moisture and other impurities and contaminants from pressurized air or gas using a chemical deliquescent desiccant in particle or pelletlike form. Hereafter the use of the term gas will be understood to include air.

These are various arrangements known in the prior art utilizing a chemical deliquescent desiccant for removing moisture and other impurities from pressurized gas, by passing the gas through a particle or pelletlike bed of the deliquescent desiccant material. Some examples of such prior art mechanisms are disclosed in U.S. Pat. No. 3,303,621 issued Feb. 14, 1967 to W. E. Hill, and U.S. Pat. No. 3,246,453, issued Apr. 19, 1966 to Philip S. Becker. However, sometimes in prior art devices, the gas does not flow through the desiccant bed uniformly, and the force of such nonuniform flow of compressed gas sometimes creates fissures or voids through the desiccant bed which reduces the effectiveness of the drying operation and usually necessitates early replacement of the desiccant bed. Moreover, sometimes in the prior art devices, the desiccant solution which drains down from the desiccant bed as the moisture is removed from the gas by the desiccant, "splashes" up onto the underside of the desiccant bed, which causes a decrease in the drying efficiency of the bed and prevents the uniform movement of the pressurized gas through the desiccant bed.

The present invention provides a novel arrangement of gas dryer embodying vertically spaced grid means which divides the housing of the dryer into an upper chamber, an intermediate chamber, and a lower chamber, with inlet and outlet means respectively communicating with the lower and upper chambers, and wherein the lower grid causes the inlet gas to be diffused and therefore be more uniformly distributed in the housing for more uniform passage through the desiccant bed which is supported on the upper grid. The inlet and outlet respectively extend from exteriorly of the dryer housing interiorly of the latter, and to adjacent the vertical axis of the housing, thereby providing for a more uniform flow of the gas through the dryer, to improve the drying operation.

Accordingly, an object of the invention is to provide a novel deliquescent desiccant-type dryer for removing moisture and other contaminants from pressurized gas.

Another object of the invention is to provide a compressed gas dryer of the chemical particle or pellet deliquescent desiccant type, including an upper chamber partially defined by a generally horizontally oriented grid, a lower chamber partially defined by a generally horizontally oriented lower grid spaced vertically from said upper grid, and an intermediate chamber disposed between said upper and lower grids with said upper grid being adapted to support a bed of the deliquescent desiccant material thereon, and with the lower grid being adapted to diffuse the inlet gas and cause it to more uniformly engage the underside of the deliquescent desiccant chemical bed as the inlet gas passes through the lower grid into the intermediate chamber, and then into engagement with the desiccant bed after passage through the upper grid.

Another object of the invention is to provide a gas dryer for the aforementioned type wherein the gas inlet and gas outlet comprise ducts which extend from exteriorly of the dryer housing to adjacent the vertical axis of the dryer, so that incoming gas into the dryer is more uniformly passed through the dryer and through the desiccant bed in the dryer.

Another object of the invention is to provide a gas dryer of the above-discussed type wherein the upper and lower grids each comprise laterally spaced elongated, barlike members defining passageways therebetween through which pressurized gas is adapted to pass and into engagement with the deliquescent desiccant bed of chemical material, and with the barlike members having arcuate upwardly facing exterior surfaces for facilitating the flow of solution from the deliquescent desiccant bed down through the grid to the lower chamber in the housing.

A still further object of the invention is to provide a dryer of the latter-mentioned type wherein the grid bars are of plastic tubularlike structure.

A further object of the invention is to provide a dryer of the above-discussed type wherein the grid includes elongated laterally spaced support stringers which may have scalloped surfaces thereon receiving in retained relation the elongated barlike members of the grid.

A still further object of the invention is to provide a novel gas inlet arrangement for a dryer of the above-discussed type wherein the gas upon its entry into the lower chamber is directed toward the interior surfaces of the dryer housing so that the angle of incidence of the gas against the interior of the housing is such so as to direct the gas upwardly away from the solution pool in the bottom of the housing, thereby aiding in preventing the gas from being contaminated by oils, scale particles and the like conventionally found in the solution pool.

Other objects and advantages of the invention will be apparent from the following description taken in conjunction with the accompanying drawings wherein:

FIG. 3 is a sectional view taken generally along the plane of line 3–3 of FIG. 1 looking in the direction of the arrows;

Referring now again to the drawings, and in particular to FIGS. 1 through 8 thereof, there is shown a dryer mechanism comprising a preferably metal tank or housing 10, which in the embodiment illustrated is of generally upstanding elongated cylindrical configuration, having an inlet 12 for receiving pressurized gas and an outlet 14 for removal of the gas from the dryer tank.

In the embodiment illustrated, the dryer tank comprises a central generally cylindrical sleeve section 16 and upper and lower dome-shaped end sections 18 and 18a. As can be best seen in FIGS. 1 and 7, the upper and lower edges of the cylindrical central sleeve section of the tank are preferably beveled inwardly as at 19 and are received interiorly of the upper and lower end sections. The tank sections may then be welded along the juncture seam to form an air or gastight enclosure. However, it will be understood that sections 16, 18 and 18a may be joined by any suitable means including a flush connection between the sections.

Figure 1:
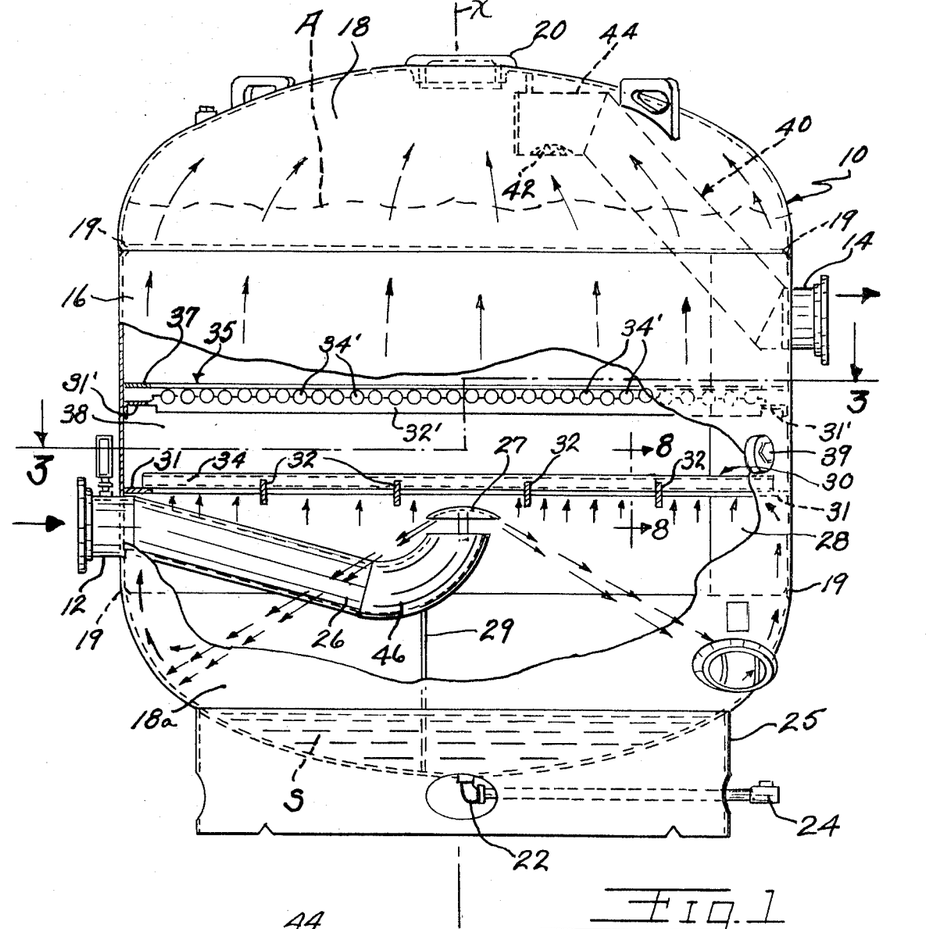
FIG. 1 is a partially broken, elevational view of a deliquescent desiccant-type dryer embodying the present invention.
Figure 2:
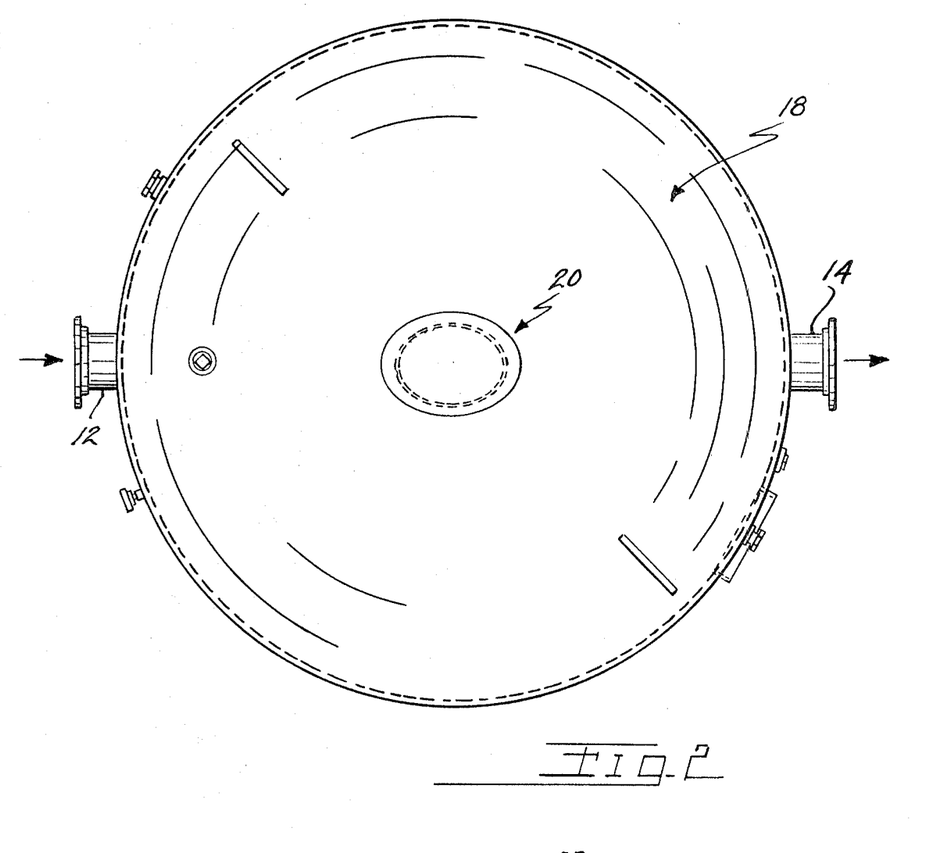
FIG. 2 is a top plan view of the FIG. 1 dryer.

The upper end section 18 may be provided with a gastight desiccant filler hatch 20 through which is accomplished replenishment of the chemical deliquescent desiccant for drying the gas. A drain 22 may be provided in the bottom section of the housing or tank, for draining the liquid solution S which flows down from the deliquescent desiccant bed. The drain may be provided with a valve mechanism 24 of any suitable type, for controlling the draining of the solution from the tank. The tank may be supported in upright condition on ringlike stand 25.

Figure 5:
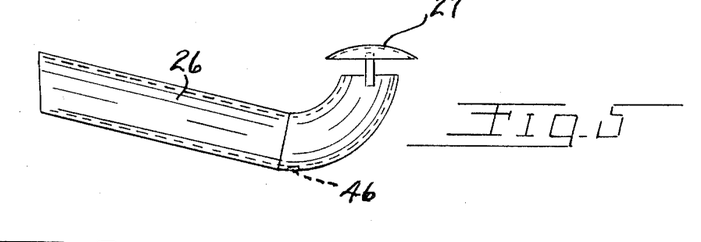
FIG. 5 is an enlarged side elevational view of the inlet duct and associated baffle for the dryer.
Figure 6:
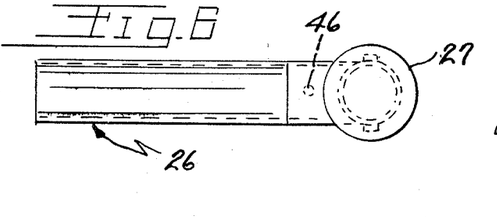
FIG. 6 is a top plan view of FIG. 5.
Figure 7:
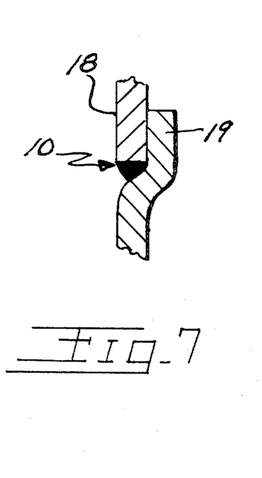
FIG. 7 is an enlarged, fragmentary view showing a method of joining the dome-shaped end portions of the dryer housing to the central cylindrical sleeve portion.

The gas inlet 12 for the dryer comprises a duct 26 which, in the embodiment illustrated in FIG. 1, enters the side of the dryer tank and then slopes diagonally downwardly and then reverses itself, and extends upwardly to terminate adjacent or on the vertical axis X–X of the dryer housing. An inverted dished-shaped baffle 27 may be secured to the exit end of the inlet duct 26 for causing the inlet gas as it egresses from the exit end of the inlet duct, to impinge on the underside or concave surface of the baffle, causing the inlet gas to be directed outwardly and downwardly from the baffle plate in a generally uniform pattern, into the lower chamber 28 of the dryer housing below lower grid assembly 30.

In this connection, the baffle 27 is so arranged with respect to the exit end of the inlet duct 26, and the curvature of the walls of lower end portion 18a of housing 10 is such that the angle of incidence of the stream of gas flowing outwardly and downwardly from baffle 27 tends to cause the gas, upon striking the interior surface of the housing, to deflect upwardly away from the bottom of the dryer housing, thereby directing the gas away from contact with the solution S in the bottom of the housing. This aids in maintaining the gas free of the contaminants such as oil, rust, scale, etc. conventionally found in the lower portion of the housing where the solution S collects. A support rod 29 may be provided extending upwardly from bottom section 18a of the housing for supporting inlet duct 26.

Lower grid 30 may comprise a ringlike support member 31 which may be supported by any suitable means (e.g. brackets) to the interior of the housing. Elongated support stringers 32 are spaced laterally from one another and extend across the inner periphery of the ring 31, and may be supported at their ends on ring 31. The upper edge of each support stringer 32 preferably has bar locating means such as scallops 32a (FIG. 8) with the scalloped portions receiving therein grid bars 34, thus evenly spacing the grid bars laterally with respect to one another. In the embodiment illustrated this spacing of the grid bars with respect to one another is approximately three-eighths of an inch. The bars 34 preferably have arcuate or convex upwardly facing surfaces so that solution draining down from the bed A of deliquescent desiccant material supported on upper grid assembly 35, rapidly passes through the grid assembly and is not retained on the grid.

Figure 8:
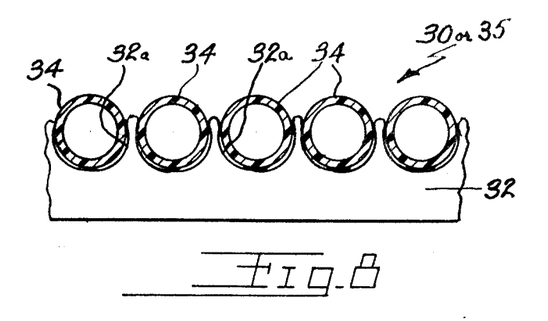
FIG. 8 is an enlarged, fragmentary, elevational view taken generally along the plane of line 8–8 of FIG. 1 and showing the stringer members having scalloped surfaces thereon and holding the grid bar members in retained relation.

Bars 34 may be formed of any suitable material but may be expeditiously formed of plastic tubing, such as generally rigid polyvinyl chloride tubing of predetermined lengths. It will be seen that the somewhat yieldable nature of the tubing enables the latter to be forced down into the scalloped portions of the support stringers 32 and be held by such scalloped portions. The scallop configuration of stringers 32 is preferably such that once the tubing is forced through the mouth or entranceway of the respective scallop, the tubing is not tightly gripped by the scallop configuration, to permit ready expansion and contraction of the stringers and bars 34 with respect to one another, during heating and cooling of the dryer mechanism.

Upper grid assembly 35 is spaced vertically upwardly from lower grid assembly 30 and may be constructed in a generally similar manner as aforementioned grid assembly 30 except that the elongated stringer members 32' and associated bars 34' respectively extend generally transverse to the directions of extension of the corresponding stringers 32 and associated bars 34 of lower grid assembly 30, and as can be best seen in FIG. 3. Grid assembly 35 may also include an upper retainer ring 37 which rests on the ends of grid bars 34'

In FIG. 1, the support rings 31, 31' of the lower and upper grids 30, 35 may be spaced vertically within a range of approximately 2 to 12 inches from one another to thereby define in conjunction with housing 10, intermediate chamber 38. The upper grid assembly 35 supporting the bed of deliquescent desiccant chemical material thereon as aforementioned, above intermediate chamber 38, maintains the bed away from collected solution S with the lower grid acting as a buffer between the collected solution and the underside of the desiccant bed. Access door 39 may be provided opening into intermediate chamber 38, for convenient insertion of grid bars 34, 34' into the dryer housing and removal of the grid bars from the dryer housing, in the event of the need to inspect or replace one or more of the grid bars.

Any suitable deliquescent desiccant chemical materials in particle or pelletlike form can be utilized for the desiccant bed A, such as, for instance, the type disclosed in the U.S. Pat. No. 3,390,511 issued July 2, 1968 to Orlo Clair Norton. As the inlet gas passes through the desiccant bed, the bed deliquesces with the solution draining down from the bed through the upper grid 35, through the intermediate chamber 38, and then through the lower grid 30 to the lower portion of the dryer housing, where it is adapted for removal via the drain 22.

Figure 4:
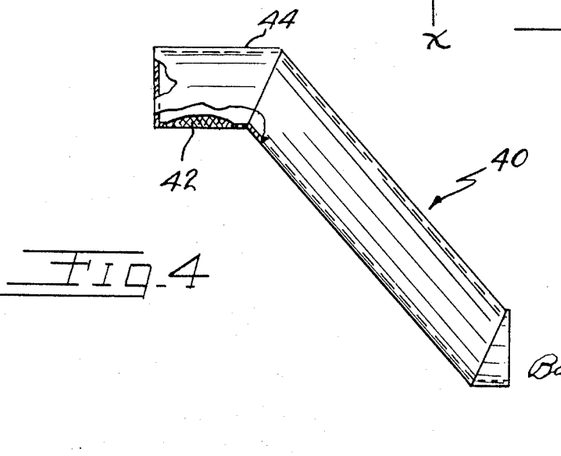
FIG. 4 is an enlarged, partially broken elevational view of the outlet duct for the dryer.

The outlet 14 from the dryer housing any include an elongated duct 40 disposed in upper chamber 41, which duct commences generally adjacent the vertical axis X–X of the dryer housing adjacent the top portion thereof and extends generally horizontally, and then diagonally downwardly, and then horizontally out through the sidewall of the housing, as can be best seen in FIGS. 1 and 4. Duct 40 has an opening 42 preferably in the underside of horizontal section 44 thereof, which opening is preferably screened, and through which the gas, after passing through the deliquescent desiccant bed A, enters the outlet duct. Since the outlet opening 42 is generally adjacent the vertical axis of the dryer housing, the gas is generally uniformly directed to the outlet opening 42 after it has passed through the desiccant bed, aiding in maintaining a generally uniform gas flow through the dryer mechanism.

Operation of the gas dryer may be as follows. The pressurized air or gas containing moisture initially enters the tank at the inlet 12, flows through the inlet duct 26 diagonally downwardly and then upwardly, to impinge against the underside of baffle plate 27, the latter causing the inlet gas to be dispersed generally uniformly outwardly and downwardly within the lower chamber. Duct 26 may have a drain opening 46 in the lowermost portion thereof, for draining out accumulated moisture. The incoming gas may be at pressures ranging to as high as 20,000 p.s.i.g. and preferably is at a temperature not much above approximately 120° F., although higher temperatures can also be effectively handled by the dryer mechanism. The gas is usually cooled upon striking the interior surface of the lower section of the dryer housing, and is directed upwardly where it is uniformly diffused and reduced in velocity in lower chamber 28. The inlet gas then moves up through the spaces defined by the bars 34 of the lower grid, the latter reducing eddy currents and directing the gas upwardly into intermediate chamber 38. In chamber 38, the individual gas flow streams from between bars 34, are diffused, and pressure and velocity differences across the chamber are reduced. The gas then flows upwardly through the upper grid 35 and into engagement with underside of the deliquescent desiccant bed supported on the upper grid. As the gas passes through the upper grid disposed transverse with respect to the bars of the lower grid, the gas flow is uniformly diffused and low in velocity. The inlet gas then passes through the interstices formed by the particle or pelletlike masses of the deliquescent desiccant bed. Thus the gas passes through both grids and is passed more uniformly through the desiccant bed without the creation of fissures and channels through the desiccant bed, resulting in a more effective and efficient drying operation. The arcuate surfaces of the bars of the grids provide for convenient movement of the resultant solution from the deliquescent desiccant bed down to the bottom of the dryer. Since the lower grid is spaced from the upper grid and is disposed intermediate the upper grid and the exit end of the inlet duct, any "splash" from the solution in the bottom of the dryer, is generally blocked by the lower grid from being carried upwardly by the gas into engagement with the underside of the desiccant bed. Accordingly, the latter is maintained in gas pervious condition, for uniform passage of the gas therethrough.

Referring now to FIGS. 9 through 16, there is disclosed another embodiment of dryer mechanism utilizing a double grid arrangement. However, in this embodiment, the gas inlet 12' enters the dryer housing at the bottom of the dryer housing 10' and at the location of the vertical axis X-X thereof, with the inlet duct 26' extending upwardly to a point disposed closely adjacent the underside of the lower grid structure 30' An inverted dished-shaped baffle plate 27' is mounted on the exit end of the inlet duct in spaced relation thereto as shown in detail in FIGS. 13 and 14, which causes the inlet gas to be directed outwardly and downwardly after it impinges against the baffle plate. As can be seen, the inlet gas flowing outwardly and downwardly from the baffle plate engages the curved interior surface of the lower end section 18a' of the dryer housing at an angle of incidence which tends to direct the gas to move upwardly away from the bottom portion of the housing where the desiccant solution S' collects. With such an arrangement, the drain 22 is disposed laterally of the gas inlet 12' and communicates with the lower chamber 28' at a point which is sufficient to drain substantially all of the bottom of the lower chamber 28'.

Figure 9:
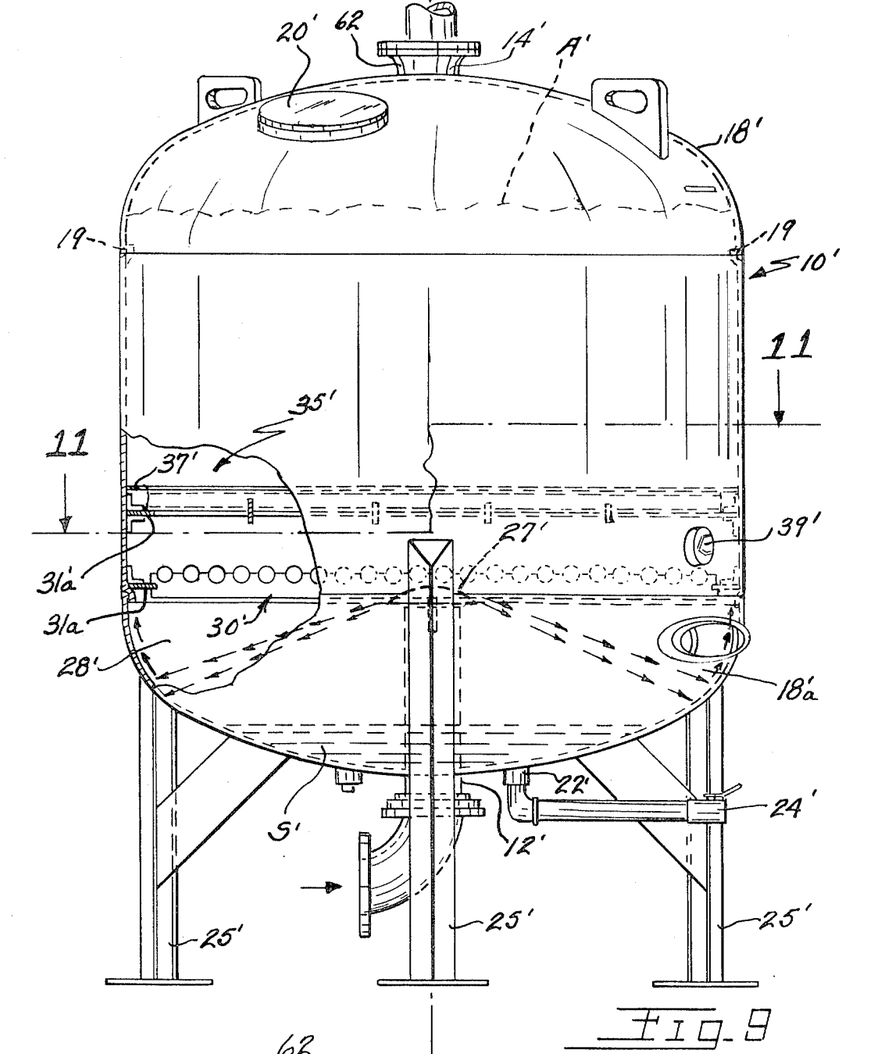
FIG. 9 is a side elevational, partially broken view of a modified form of dryer.
Figure 10:
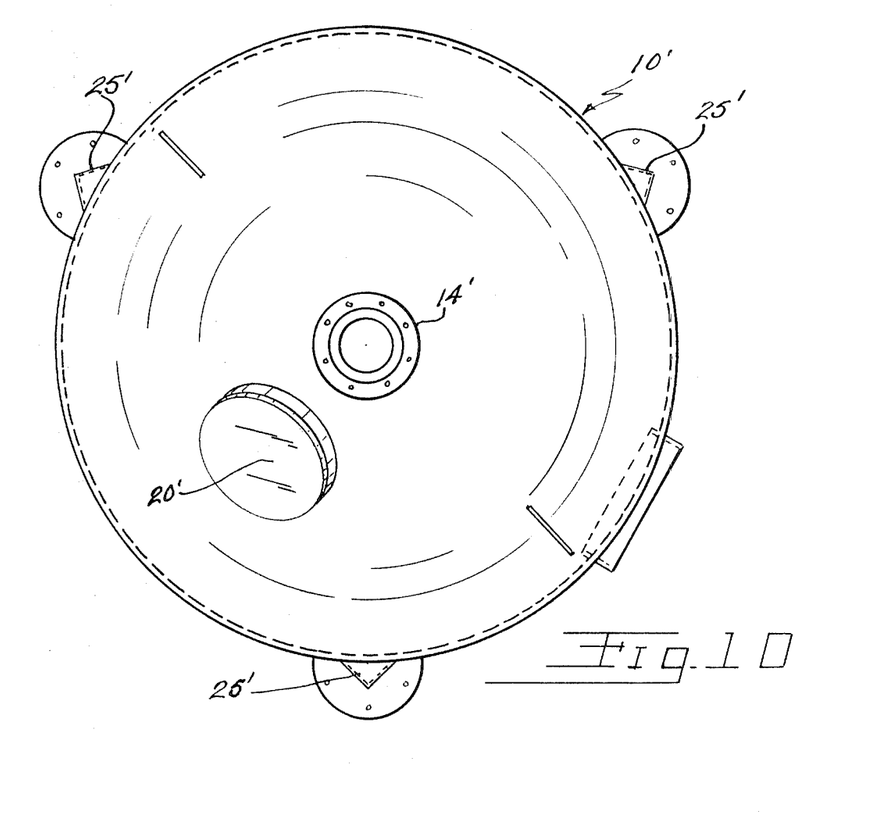
FIG. 10 is a top plan view of the dryer shown in FIG. 9.
Figure 11:
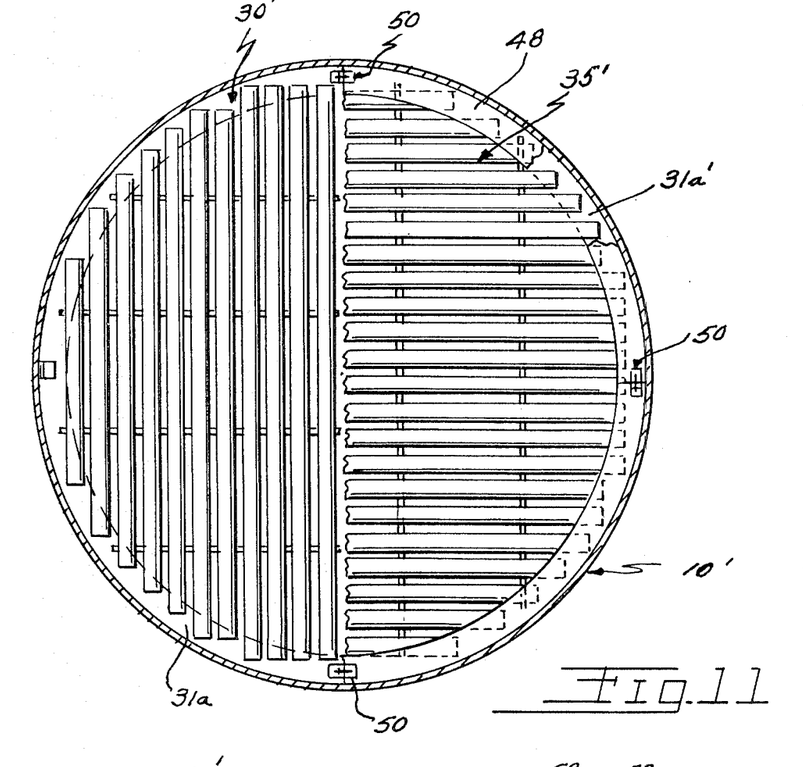
FIG. 11 is a sectional view taken generally along the plane of line 11–11 of FIG. 9 looking in the direction of the arrows.
Figure 12:
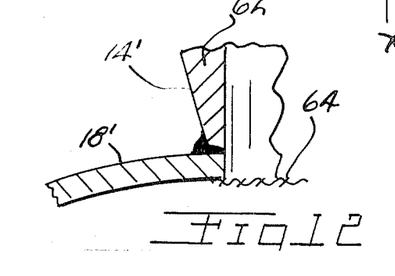
FIG. 12 is an enlarged, fragmentary view of the gas outlet of the dryer of FIG. 9.
Figure 13:
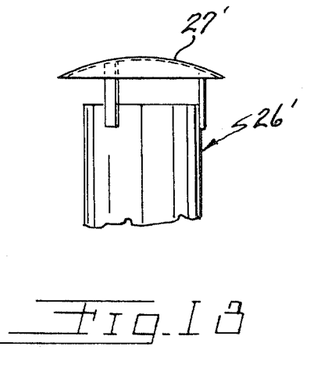
FIG. 13 is an enlarged, fragmentary side elevational view of the inlet duct of the dryer of FIG. 9, and showing the dish-shaped baffle mounted on the exit end of the inlet duct for diffusing the incoming as as it enters the dryer enclosure.
Figure 14:
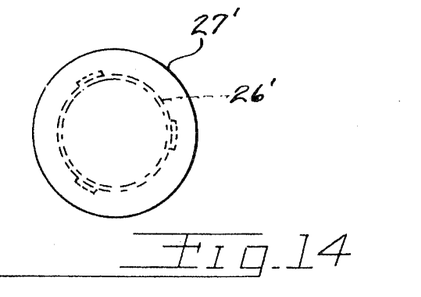
FIG. 14 is a top plan view of the baffle shown in FIG. 13.
Figure 15:
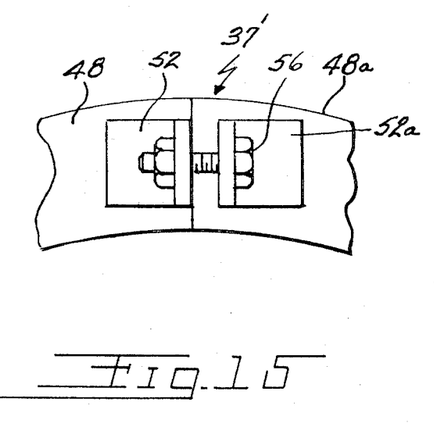
FIG. 15 is a fragmentary, enlarged, top plan illustration of the expansible retainer ring for the upper grid assembly of the dryer of FIG. 9.
Figure 16:
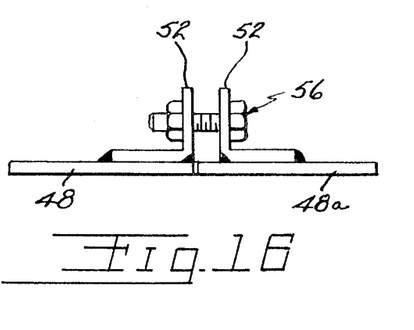
FIG. 16 is a side elevational view of the expansible retainer ring segment illustrated in FIG. 15.

The housing 10' in the embodiment illustrated is supported on spaced legs 25', and at a substantial distance from floor level, to provide for good circulation of atmospheric air around the underside of the housing, thus aiding in cooling the housing walls resulting in the greater cooling of the inlet gas when it engages the interior of the housing.

The upper grid assembly 35' may be generally similar to the upper grid assembly 35 of the first described embodiment, except that the top retainer ring member 37' supported on the generally horizontally extending bar members of the upper grid assembly, is of sectional construction including arcuate sections 48, 48a and which are adjustably coupled to one another by means of connectors 50. The connectors, as can be best seen in FIGS. 15 and 16, may comprise anglelike members 52 connected to the respective ring section (as by means of welds) and having a fastener 56 extending between the apertured anglelike members. By loosening the nut of the fastener, and adjusting the ring sections with respect to one another in a generally horizontal plane, the exterior (and interior) diameter of the retainer ring can be varied. The retainer ring 37' is preferably not permanently fastened to the dryer housing and is movable therein, for ease in replacement of the upper grid bars. The upper retainer ring 37 of the first-described embodiment may of course also be formed of the sectional construction of ring 37'. In this embodiment, the support rings 31a and 31a' (FIG. 9) of respectively the lower grid assembly 30' and the upper grid assembly 35' may be spaced approximately 2 to 12 inches from one another, with both grid assemblies being disposed below the horizontal center plane of the dryer housing, thus providing for a greater depth of desiccant bed A'. Any suitable means, such as brackets or the like (not shown) may be provided for detachably retaining retainer ring 37' in position during shipping of the dryer.

The gas outlet 14' from the dryer housing is disposed at the upper end of the housing and extends from the latter in the general vicinity of the vertical axis of the dryer housing. Such outlet may include a collar portion 62, and screening means 64 (FIG. 12) preferably extending across the outlet opening interiorly of the dryer housing, to screen any large particles attempting to pass into the outlet system. The access port 20' for the dryer, for inserting the deliquescent desiccant thereinto, is spaced laterally of the exit collar 62 and has an airtight removable cover thereon for closing the access port. In other respects the FIGS. 9 and 10 dryer arrangement may be generally similar to the first described embodiment of dryer, and like parts have been designated with the same reference number as that used in the first described embodiment, but with the addition of the suffix prime (') added thereto.

From the foregoing discussion and accompanying drawings it will be seen that the invention provides a deliquescent desiccant-type gas dryer which includes a housing having a gas inlet and a gas outlet and having a novel double-grid arrangement dividing the housing into an upper chamber, an intermediate chamber and a lower chamber, with the grid structure being disposed intermediate the gas inlet and the gas outlet, for causing the inlet gas to pass through a bed of deliquescent desiccant material supported by the upper grid. The inlet gas is directed by ductwork to approximately the vertical axial center of the dryer housing and to a position adjacent the underside of the lower grid assembly, and then is adapted to engage a baffle which directs the inlet gas uniformly downwardly and outwardly in the lower chamber prior to its movement upwardly through the lower grid assembly, and then into the intermediate chamber and then through the upper grid assembly into the bed of desiccant material. The grid assemblies in conjunction with the structural arrangement of inlet provide for more uniform passage of the inlet gas through the desiccant bed, to increase the drying efficiency of the mechanism. The outlet from the dryer extends from at or adjacent the vertical axis of the dryer housing to the exterior of the dryer, and thus aids in causing more uniform passage of the gas through the desiccant bed.

The terms and expressions which have been used are used as terms of description, and not of limitation, and there is no intention in the use of such terms and expressions of excluding any equivalents of any of the features shown or described, or portions thereof, and it is recognized that various modifications are possible within the scope of the terms and expressions used to describe the invention.

What we claim is:

1. In a deliquescent desiccant-type gas dryer comprising a closed housing, a gas inlet communicating with the interior of said housing, a gas outlet communicating with the interior of said housing, means dividing the interior of said housing into an upper chamber and an intermediate chamber and a lower chamber, the last-mentioned means comprising a generally horizontally oriented upper grid and a generally horizontally oriented lower grid, said upper grid being spaced vertically above said lower grid and defining said intermediate chamber, said grids being spaced vertically a substantial amount from one another whereby said intermediate chamber is of substantial height and is substantially unobstructed, said upper grid being adapted to support a gas pervious bed of deliquescent desiccant material thereon adapted for removing moisture and other contaminants from a gas stream adapted to pass through said grids and from said inlet to said outlet, said inlet comprising a duct extending from exteriorly of said housing into said lower chamber and terminating in a substantially upwardly extending portion disposed generally along the vertical axis of said housing, said inlet including baffle means coacting with said upwardly extending portion for directing the gas downwardly therefrom in said lower chamber, said gas outlet comprising a duct extending from exteriorly of said housing into said upper chamber to a location adjacent the vertical axis of said housing, said outlet duct comprising aperture means therein adjacent said vertical axis communicating the interior of said duct with said upper chamber, and said grids each comprising laterally spaced support stringers extending across said housing and elongated members supported on said support stringers in generally uniform laterally spaced relation with respect to one another to form the respective of said grids, said lower grid being operable to diffuse the inlet gas prior to engagement thereof with the bed of desiccant material to provide more uniform application of inlet gas to the underside of the bed and protecting the underside of the bed from splash of deliquescent solution in the lower chamber of said housing.

2. A dryer in accordance with claim 1 wherein said elongated members of said upper grid include plastic bars having upwardly facing convex exterior surfaces thereon for facilitating flow of solution from the deliquescent desiccant bed down through said grids to the lower chamber.

3. A dryer in accordance with claim 1 wherein said elongated members of said lower grids extend in directions generally transverse to the direction of extension of said elongated members of said upper grid, said elongated members having arcuate upwardly facing exterior surfaces.

4. A dryer in accordance with claim 1 wherein said housing includes a drain for deliquescent liquid in the lower end portion of said housing communicating with said lower chamber, said lower end portion comprising arcuate interior surfaces curving upwardly with respect to said drain, said baffle means being disposed adjacent the exit end of said upwardly extending portion of said gas inlet in said lower chamber for directing inlet gas diagonally outwardly and downwardly in said lower chamber prior to passing thereof upwardly through said lower grid, said baffle means being so oriented with respect to said arcuate surfaces and coacting with the latter to cause the pressurized inlet gas in said lower chamber egressing from said gas inlet and upon striking of said arcuate surfaces, to be deflected upwardly away from the area of said drain.

5. A dryer in accordance with claim 4 wherein both of said grids are disposed below the horizontal center plane of said housing.

6. A dryer in accordance with claim 1 wherein said upper and lower grids are spaced vertically with respect to one another a distance within a range of approximately 2 to 12 inches.

7. A dryer in accordance with claim 6 wherein said gas outlet comprises a duct extending from a side of said housing into said upper chamber to a location adjacent the vertical axis of said housing, and aperture means in said duct communicating the interior of said duct with said upper chamber, said aperture means being disposed adjacent the vertical axis of said housing.

8. In a deliquescent desiccant-type gas dryer comprising, a housing, a gas inlet communicating with the interior of said housing, a gas outlet communicating with the interior of said housing, and means dividing the interior of said housing into an upper chamber, an intermediate chamber and a lower chamber, the last-mentioned means comprising an upper grid and a lower grid, said upper grid being spaced vertically above said lower grid and defining said intermediate chamber, said upper grid being adapted to support a gas pervious bed of deliquescent desiccant material thereon adapted for removing moisture and other contaminants from a gas stream adapted to pass through said grids and from said inlet to said outlet, said upper grid comprising laterally spaced support stringers and elongated tubularlike members supported on said support stringers in laterally spaced relation with respect to one another to form said upper grid, said stringers being scalloped and said elongated members comprising tubular plastic, such as for instance polyvinyl chloride plastic, and are received in the complementary scallops of said stringers to provide a generally horizontally oriented gas pervious deliquescent desiccant bed support.

9. A dryer in accordance with claim 8 wherein both said upper and lower guide have upwardly facing convex exterior surfaces for facilitating the draining of solution from said deliquescent desiccant bed down to the lower chamber in said housing, said grids being oriented generally horizontally and being of substantially the same area.

10. A dryer in accordance with claim 8 wherein said gas inlet comprises a duct extending from an exterior side of said housing into said lower chamber and to adjacent the vertical axis of said housing, and then turns vertically upwardly and extends along the vertical axis of said housing.

11. A dryer in accordance with claim 8 including liquid drain means communicating with said lower chamber.

12. A dryer in accordance with claim 8 wherein said housing is of cylindrical exterior configuration and including a central portion and generally dome-shaped upper and lower portions connected to said central portion in sealed relation therewith.

13. A dryer in accordance with claim 8 including elongated, laterally spaced leg means supporting said housing above a supporting surface and providing for circulation of air around the exterior of said housing.

14. A dryer in accordance with claim 8 wherein said gas inlet dryer a baffle means disposed adjacent the exit end thereof interiorly of said housing, said baffle means comprising an inverted dished-shaped member spaced from the exit end of said inlet for directing inlet gas outwardly and downwardly in said lower chamber prior to passage thereof upwardly through said lower grid.

15. A dryer in accordance with claim 14 wherein said baffle member is disposed below said lower grid in closely oriented relationship thereto.

16. a dryer in accordance with claim 8 wherein said gas inlet enters the bottom of said housing at approximately the vertical axis of said housing and extends generally vertically upwardly to terminate below said lower grid.

17. A dryer in accordance with claim 16 wherein said gas outlet enters said housing at the top thereof adjacent the vertical axis of said housing.

18. In a deliquescent desiccant-type gas dryer comprising, a housing, a gas inlet communicating with the interior of said housing, a gas outlet communicating with the interior of said housing, and means dividing the interior of said housing into an upper chamber, an intermediate chamber and a lower chamber, the last-mentioned means comprising an upper grid and a lower grid, said upper grid being spaced vertically above said lower grid and defining said intermediate chamber, said upper grid being adapted to support a gas pervious bed of deliquescent desiccant material thereon adapted for removing moisture and other contaminants from a gas stream adapted to pass through said grids and from said inlet to said outlet, said upper grid including plastic bars having upwardly facing convex exterior surfaces thereon for facilitating flow of solution from the deliquescent desiccant bed down through said grids to the lower chamber, and also including an upper ringlike retainer member supported on said bars, said retainer member being of sectional construction, and means for movably coupling said sections to one another and providing for selectively varying the size of said retainer member.